United States Patent
Casabona et al.

(10) Patent No.: US 6,861,983 B2
(45) Date of Patent: Mar. 1, 2005

(54) METHOD AND APPARATUS FOR REDUCING ELECTROMAGNETIC INTERFERENCE AND JAMMING IN GPS EQUIPMENT OPERATING IN ROLLING ENVIRONMENTS

(75) Inventors: Mario M. Casabona, Cedar Grove, NJ (US); Murray W. Rosen, Parsippany, NJ (US); David J. Van Alstine, Midland Park, NJ (US)

(73) Assignee: Electro Radiation, Inc., Teterboro, NJ (US)

( * ) Notice: Subject to any disclaimer, the term of this patent is extended or adjusted under 35 U.S.C. 154(b) by 0 days.

(21) Appl. No.: 10/792,580

(22) Filed: Mar. 3, 2004

(65) Prior Publication Data

US 2004/0164900 A1 Aug. 26, 2004

Related U.S. Application Data

(63) Continuation of application No. 10/309,760, filed on Dec. 4, 2002, now abandoned.
(60) Provisional application No. 60/335,266, filed on Dec. 4, 2001.

(51) Int. Cl.[7] .............................. H01Q 3/00; G01S 5/02
(52) U.S. Cl. .................. 342/420; 342/357.06; 342/359; 342/362; 342/370; 342/371; 342/430
(58) Field of Search ...................... 342/357.02, 357.06, 342/357.11, 362, 370–371, 428, 430, 420, 359

(56) References Cited

U.S. PATENT DOCUMENTS

| | | | |
|---|---|---|---|
| 5,125,108 A | 6/1992 | Talwar | 455/278.1 |
| 5,428,831 A | 6/1995 | Monzello et al. | 455/296 |
| 5,548,838 A | 8/1996 | Talwar et al. | 455/304 |
| 5,694,416 A | 12/1997 | Johnson | 375/206 |
| 5,712,641 A | 1/1998 | Casabona et al. | 342/362 |
| 5,822,429 A | 10/1998 | Casabona et al. | 380/9 |
| 5,872,540 A | 2/1999 | Casabona et al. | 342/362 |
| 6,388,610 B1 | 5/2002 | Przyjemski et al. | 342/357.06 |
| 6,590,528 B1 | 7/2003 | DeWulf | 342/357.12 |
| 2002/0169578 A1 | 11/2002 | Yang | 702/152 |

OTHER PUBLICATIONS

Anaren Microwave, Inc., "Application Information and Technical Data,RF Frequency Conversion," Catalog No. 17, Anaren Microwave Components, Section B, pp. 139 and 157–159, 1984.

Anaren Microwave, Inc., "RF Control and Switching," Catalog No. 17, Anaren Microwave Components, Section C, pp. 175 and 189–192, 1984.

Ender, J.H.G., "Experimental Results Achieved With the Airborne Multi–Channel SAR System AER–II," European Conference on Synthetic Aperture Radar, pp. 315–318, May 1998.

Microwave Filter Company, Inc., "Microwave Filter Company Phase Cancellation Filters," www.microwavefilter.com.

*Primary Examiner*—Thomas H. Tarcza
*Assistant Examiner*—F H Mull
(74) *Attorney, Agent, or Firm*—Wolff & Samson PC

(57) ABSTRACT

A method and apparatus for reducing electromagnetic interference (EMI) and jamming in Global Positioning System (GPS) receivers operating on rolling or spinning platforms and/or environments is provided. An antenna system having a pair of diametrically-mounted elements provides interferometric cancellation for spatial and polarization nulling of interference signals. The antenna system, operating in conjunction with multiplexing and anti-jamming electronics, provides interference suppression for a GPS receiver connected thereto. Interference cancellation is provided in jamming and non-jamming environments by selectively employing spatial or polarization nulling of the interference signal.

16 Claims, 8 Drawing Sheets

METHOD AND APPARATUS FOR REDUCING ELECTROMAGNETIC INTERFERENCE AND JAMMING IN GPS EQUIPMENT OPERATING IN ROLLING ENVIRONMENTS

RELATED APPLICATIONS

This application is a continuation of U.S. patent application Ser. No. 10/309,760 filed Dec. 4, 2002, now abandoned, and claims the benefit of U.S. Provisional Patent Application Ser. No. 60/335,266 filed Dec. 4, 2001, the entire disclosures of which applications are expressly incorporated herein by reference.

BACKGROUND OF THE INVENTION

1. Field of the Invention

The present invention relates to a method and apparatus for reducing electromagnetic interference and jamming in communications equipment. More particularly, the present invention relates to a method and apparatus for reducing electromagnetic interference and jamming in Global Positioning System (GPS) receivers operating in rolling or spinning environments and/or platforms.

2. Related Art

Radio frequency (RF) communications equipment are often prone to electromagnetic interference, whether such interference is caused naturally (e.g., by lightning or natural source) or is man-made (e.g., interference from ignition systems, nearby RF equipment, adjacent channels, or other sources). In particular, RF jamming represents a type of man-made interference that can severely compromise, if not entirely disable, RF receivers and transmitters. Thus, the need to reduce, if not entirely eliminate, RF interference and jamming is a critical concern for communications systems, particularly in military communications systems.

Global Positioning System (GPS) receivers represent a type of RF technology that plays a critical role in instrumentation and navigation systems. For example, GPS is often integrated into robust navigation systems for spinning and non-spinning munitions, and provides both inertial navigation and precision position updates for such systems during flight. Unfortunately, GPS systems are prone to interference, particularly man-made interference and RF jamming. Such compromises to GPS systems can adversely affect the navigation and precision of GPS-aided projectiles. The susceptibility of RF systems generally, and GPS receivers in particular, to interference and jamming therefore necessitates an effective system for alleviating such problems.

Accordingly, what would be desirable, but has not yet been provided, is a method and apparatus for reducing electromagnetic interference and jamming in rolling platform receivers.

SUMMARY OF THE INVENTION

The present invention relates to a method and apparatus for reducing electromagnetic interference and jamming in rolling or spinning platform receivers, such as GPS receivers. An antenna system having a pair of diametrically-mounted elements provides interferometric cancellation of the interference signals via spatial and polarization nulling. The antenna system, operating in conjunction with multiplexing and anti-jamming electronics, provides interference suppression for a GPS receiver connected thereto. In a non-jamming environment, the present invention combines the two elements of the antenna system in an in-phase manner to provide a uniform, omni-directional GPS receiver pattern around the spinning or rotating body or platform In a jamming environment, the present invention provides both spatial and polarization nulling of interference signals. The present invention can operate asynchronously with respect to a rolling or spinning platform or body, and can perform interference suppression without reference or registration information derived therefrom.

The present invention adapts to the roll rate of an object, and determines the optimum antennas and/or suppression techniques to utilize for interference suppression for all roll, pitch and yaw attitudes over a given trajectory. The antenna feeds are combined using phase and amplitude weights to minimize received energy in the direction of the jamming source. In spatial nulling mode, the null-forming properties of the antenna system of the present invention produce directed and sympathetic nulls for cancellation. The directed null is aimed at the interference source, and uses time-varying control modulations to suppress interference. The sympathetic null scans the space around the platform at a roll rate that is twice the roll rate of the platform.

BRIEF DESCRIPTION OF THE DRAWINGS

These and other important objects and features of the invention will be apparent from the following Detailed Description of the Invention, taken in connection with the accompanying drawings, in which.

DETAILED DESCRIPTION OF THE INVENTION

The present invention relates to a method and apparatus for reducing electromagnetic interference and jamming in communications systems (particularly, GPS systems) operating in rolling environments and/or platforms. Diametrically positioned antennas are mounted on a rolling platform and connected to anti-jamming electronics that provide interferometric cancellation via spatial and polarization nulling of the interfering signal. GPS signals are received by the present invention, and jamming and interference signals are suppressed therefrom. The invention can operate asynchronously with relation to a spinning or rolling object, and can independently synchronize with the object to suppress interference from received signals without requiring reference or registration information from the object. The nulling patterns of the present invention can be generated without external references and without requiring pointing vectors. Further, the invention is fully adaptive to the roll rate of the object, and is capable of determining the optimum suppression technique and nulling configuration to use for interference suppression.

Figure 1:
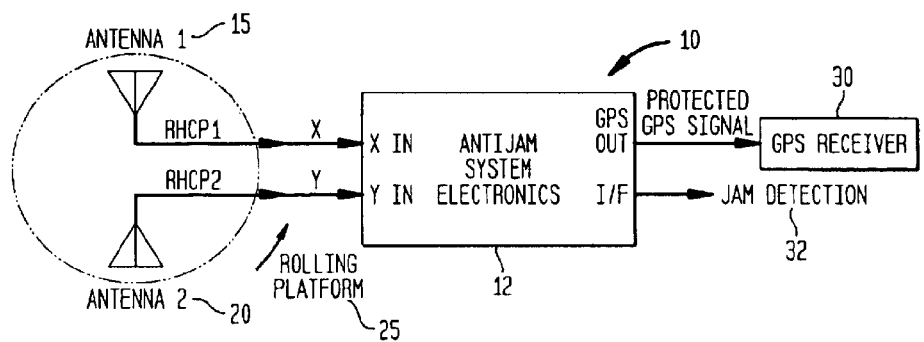
FIG. 1 is a block diagram of the anti-jamming system of the present invention.
Figure 2:
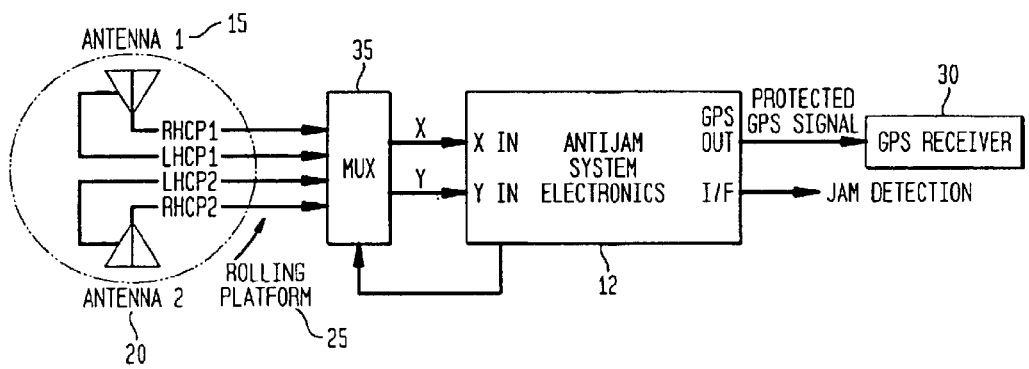
FIG. 2 is a block diagram of an alternate embodiment of the anti-jamming system of the present invention.

FIG. 1 is a block diagram of the anti-jamming system of the present invention, indicated generally at 10. A pair of antennas 15 and 20 are mounted in diametrically-opposing fashion on a rolling platform 25, and are connected to the system electronics 12 (occasionally referred to herein as "Anti-Jam Electronics" or "AJE"). The rolling platform 25 can be any rolling object, such as a missile, projectile, or other similar object. Output from antennas 15 and 20 is right-hand circularly polarized, resulting in the two signals RHCP1 and RHCP2. The two signals comprise a received signal, such as a GPS signal, having interference or jamming present therewith. When the two signals are processed by system electronics 12, the interference or jamming is removed from the received signal, producing a protected signal capable of being used by a receiver, such as GPS receiver 30. Further, a jamming detection signal 32 is produced by the system electronics 12. The configuration shown in FIG. 1 utilizes spatial nulling to eliminate jamming and interference from the received signal. Other configurations including linear or elliptical polarizers can be utilized with the present invention without departing from the spirit or scope thereof FIG. 2 is a block diagram of an alternate embodiment of the anti-jamming system of the present invention. As mentioned previously, the present invention is capable of implementing spatial and polarization nulling to reduce interference from a received GPS signal. Spatial nulling is desirable for GPS receivers operating in rolling environments, while polarization nulling is desirable for receivers operating in slowly rolling or non-rolling environments where reduced levels of interference are present. As used herein, the terms "slow" and "slowly" rolling include platform role rates of approximately 0 to 0.25 Hz, but could also include roll rates that are variable and based upon receiver performance (i.e., slow roll becomes "fast" or "quick" roll where polarization nulling ceases to provide acceptable results). Additionally, the terms "quick" and "quickly" rolling, as used herein, are meant to include all roll rates above 0.25 Hz, but could also include roll rates that are variable and based upon receiver performance.

The configuration shown in FIG. 2 provides both spatial and polarization nulling to reduce interference from a GPS signal received by antennas 15 and 20. A multiplexer 35 is connected between the antennas 15 and 20 and the system electronics 12, and receives cross-polarized signals from the antennas. The cross-polarized signals are both right-hand circularly polarized and left-hand circularly polarized, as indicated by the signals RHCP1, LHCP1, RHCP2, and LHCP2. The multiplexer 35 multiplexes the signals, allowing the system to operate in either spatial or polarization nulling modes. Switching between spatial and polarization nulling can occur automatically, and can vary dynamically over the course of an object's trajectory, spin, or other physical attribute to provide optimum interference cancellation. Further, multiplexer 35 can be any RF multiplexer known in the art, and can be controlled by commands from the system electronics 12 or by platform guidance and control functions.

Figure 3:
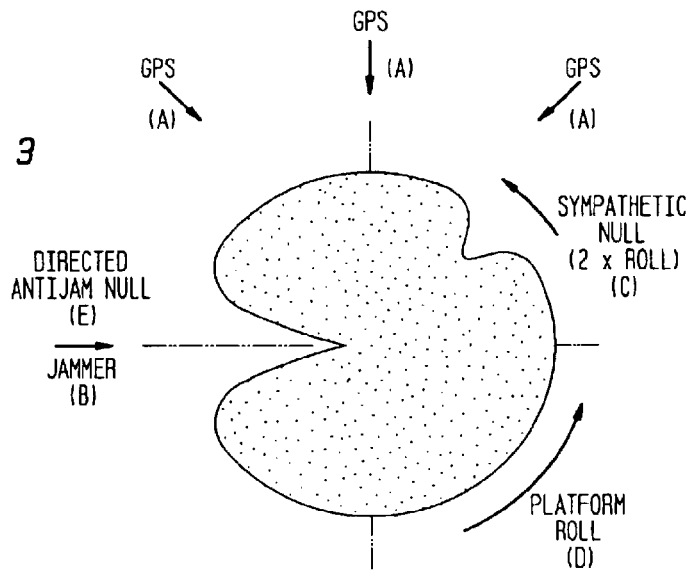
FIG. 3 is an antenna pattern graph showing operation of the anti-jamming system of the present invention on a rolling platform

FIG. 3 is an antenna pattern graph showing operation of the anti-jamming system of the present invention on a rolling platform D, using spatial nulling. The graph represents a typical antenna pattern of a directed or steered null aimed at a jamming signal B by combining two diametrically positioned antennas (such as antennas 15 and 20 of FIGS. 1 and 2) on a rolling cylindrical body. The GPS signals A arrive from the upper hemisphere. Two antennas are combined using phase and amplitude weight functions to minimize the received energy in the direction of the jamming source B. The beam- and null-forming properties of a 2-element circular array produce the primary (or directed) null E and a sympathetic (or grating) null C.

The present invention creates and maintains the directed null E and sympathetic null C on a rolling body, resulting in time-varied control modulations. The modulations maintain suppression of the jammer signal B at a roll rate generated with reference to the body on which the present invention operates. The directed null E is essentially stationary with reference to the interference source. Additionally, the sympathetic null C scans the platform at twice the roll rate of same. Since the body is in motion at the roll rate, the sympathetic null C is non-stationary. While the body is rolling, the effect on the received GPS signals A is transient. If the body stabilizes, the effect on GPS signals A due to the sympathetic null C can be more important if focused upward. For this case, the present invention reverts to polarization suppression using one antenna. The control signals of the present invention are monitored to determine the roll status of the platform (i.e., whether the platform is spinning quickly, slowly, or not at all) for selecting the desired nulling technique (e.g., spatial or polarization nulling).

Figure 4:
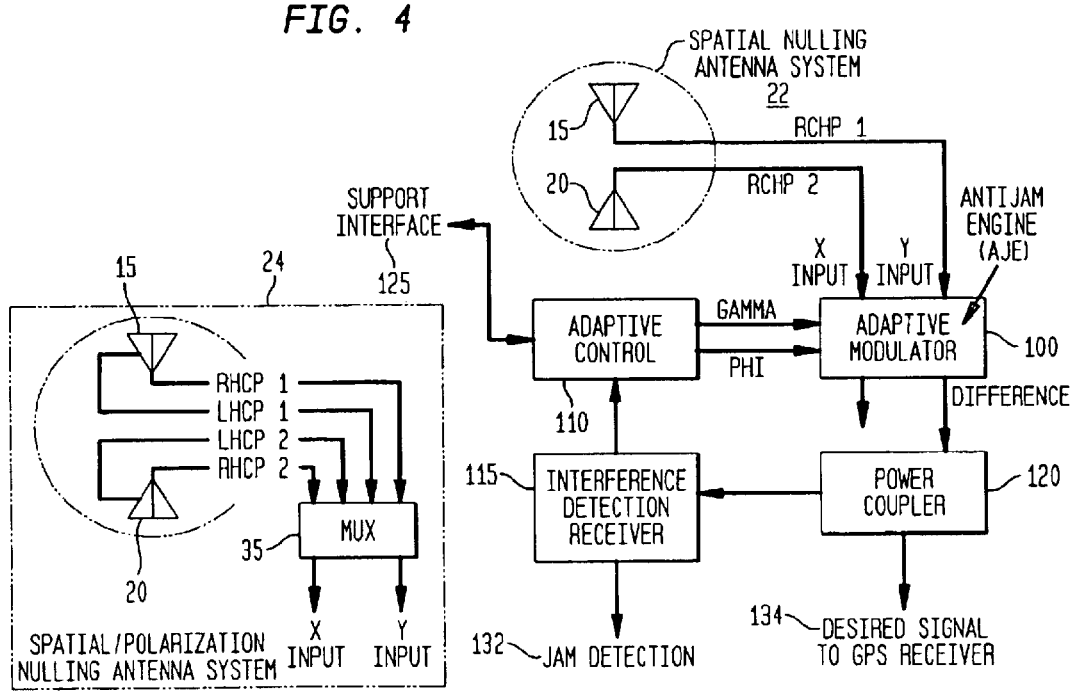
FIG. 4 is a block diagram showing the anti-jamming system of the present invention in greater detail.

FIG. 4 is a block diagram showing the anti-jamming system electronics 12 of the present invention in greater detail. A spatial nulling antenna system 22, comprising antennas 15 and 20 discussed earlier, is provided for spatial nulling of jamming signals. Optionally, a spatial/polarization nulling antenna system 24 comprising antennas 15 and 20 and multiplexer 35 can be provided for both spatial and polarization nulling of jamming signals. The outputs of either spatial antenna nulling system 22 or spatial/polarization nulling system 24 are fed to an adaptive modulator 100. An adaptive controller 110 controls the modulator 100 to provide optimum interference cancellation. The controller 110 is controlled by an interference detection receiver 115, which is coupled with the output of the modulator 100 via a power coupler 120. The interference detection receiver 115 produces a jam detection signal 132, which can be used with additional equipment or for further cancellation and/or processing. The desired GPS signal 134 is fed to any standard GPS receiver known in the art, and is free of interference or jamming. Optionally, a support interface 125 can be provided, allowing the adaptive controller 110 to be controlled from an external source.

Antennas 15 and 20 are combined using phase and amplitude weight functions applied by adaptive modulator 100 to minimize the received energy in the direction of the jamming source. In-band jamming or interference above given thresholds are detected in the GPS bands, and the interference is suppressed using either spatial or polarization nulling, thereby cancelling the interference present on the antennas 15 and 20.

The antenna systems 22 and 24 are 2-element circular arrays, and, as mentioned earlier, the spatial null created by the present invention results in a directed null and a sympathetic null. In most situations, the host platform for the antenna systems 22 or 24 rolls, and the interference source is stationary in space. The sympathetic null produced using spatial nulling scans the space around the platform roll axis at a rate that is twice the roll rate of the platform. The directed null remains spatially fixed with respect to the interference source to suppress interference as the platform roll rate varies. The sympathetic null scans across all spaces, including the GPS constellations.

The adaptive modulator 100 utilizes two control signals gamma ($\gamma$) and phi ($\phi$) produced by the adaptive controller 110, each control signal having greater than one cycle ($2\pi$ radians or 360°) of phase control in a 2 degree-of-freedom control scheme, to control the combined phases and amplitudes of the signals received by the antenna systems 22 or 24. Nulls are generated in a closed-loop manner using interference energy detected at a GPS receiver input port or the output port of the anti-jamming system 10 of the present invention. In a rolling condition, the cyclic nature of the control signals gamma and phi result in a lead/lag loop control that can extend over the range of the modulator 100 and across boundary conditions. Preferably, a calibrated phase wrap technique is implemented in the modulator 100, resulting in minimized variation in cancellation performance at the edge of the range of each control.

If the roll rate of the platform is low, or the platform is stable, the present invention detects this condition and reverts to polarization cancellation on an upwardly-directed antenna by switching the inputs of the adaptive modulator 100 to a pair of cross-polarized antenna feed signals (i.e., the outputs of the spatial/polarization nulling antenna system 24). The polarization nulling technique can tolerate cyclic control signal variation on slowly rolling or moving platforms, and can also use the aforementioned calibrated phase wrap method to minimize variation in cancellation at the edge of the range of each control. Antennas 15 and 20 are monitored for interference energy, and the antenna experiencing the lower interference level is selected and utilized by the adaptive modulator 100.

The present invention adapts to the measured roll rate by optimizing the sampling rate of detection and signal processing, integration time constants, and loop control bandwidth to maximize suppression sensitivity for detection and control functions. In a non-jamming environment, the system combines the two antennas 15 and 20 in an in-phase manner that results in a uniform, omni-directional GPS receiver pattern. In a jamming environment, the system uses the total integrated energy in the band to optimize the directed null. The adaptive control 110 uses a downhill gradient to drive the control loop in the direction of maximum null. A boundary condition on either or both of the control signals gamma and phi can initiate the phase wrap response, wherein the system returns from the boundary to the intermediate control settings to produce the equivalent modulation response in the network.

Preferably, a calibration table is programmed into the system and is based on actual measurements. Each edge setting of the control signals gamma and phi have corresponding settings near the center of the modulation range. The calibration table preferably corrects for the effects of non-linearity, temperature variation, frequency variation, etc.

The present invention can operate with a multiplexed channel, parallel channels, or with shared detection and control functions. The inputs to each channel X and Y of the adaptive modulator 100 of the present invention comprises a pair of RF signals from the antenna systems 22 or 24, as can be seen with reference to the following table:

TABLE 1

| Multiplexer Mode | X Input of Adaptive Modulator 100 | Y Input of Adaptive Modulator 100 | Modulation Mode |
|---|---|---|---|
| Receive Combine | RHCP1 | RHCP2 | Combine |
| Spatial Nulling | RHCP1 | RHCP2 | Cancel |
| Polarization Nulling 1 | RHCP1 | LHCP1 | Cancel |
| Polarization Nulling 2 | RHCP2 | LHCP2 | Cancel |

Connectivity between the antenna systems 22 or 24 and the adaptive modulator 100 can be accomplished using any suitable switching system, such as two single-pole, double-throw (SPDT) RF switches. As previously mentioned, the adaptive modulator 100 preferably has two input ports X and Y, but any desired number of input ports can be provided without departing from the spirit or scope of the present invention. The modulator 100 preferably includes varactor-controlled phase shifters configured in a 90° hybrid network, or PIN vector modulators with two or more controls and a difference output. The interference detection receiver 115 monitors the difference output of the adaptive modulator 100 via the power coupler 120. In a preferred embodiment of the present invention, the adaptive modulator 100 comprises filters and amplifiers which interface with the antenna systems 22 or 24, an RF modulator (or gamma/phi modulator), a difference port power divider/coupler, and a difference monitor port amplifier. The channel bandwidth and noise parameters are set by the arrangement of filters and low noise amplifiers. Amplifiers, filters and limiters may be located at the antenna systems 22 or 24 to compensate for separation losses, thus allowing for remote antenna placement.

The interference detection receiver 115 can comprise a crystal video receiver, logarithmic receiver, superheterodyne receiver, spectral/temporal transform processor, or other similar type of receiver. Further, the receiver 115 can implement conversion, detection or digital signal processing. Signal processing can be utilized to provide dynamic range control via an automatic gain control (AGC) on the two input antenna signals to maintain linearity. The adaptive controller 110 uses signal processing comprising analog-to-digital (ADC) conversion or encoding, signal processing and loop control algorithms in a microprocessor, and control signal digital-to-analog (DAC) conversion to drive the adaptive modulator 100.

The control signals gamma and phi generated by the adaptive controller 110 comprise iterative settings for AGC and phase shifters of the adaptive modulator 100. These signals are generally applied to the respective devices as analog controls, but digital controls are contemplated and are considered within the scope of the present invention. A control loop and signal processing algorithm, as will later be described in greater detail, compensate for apparent interference signal change due to rotation, motion, interference signal modulation, and component imbalance.

Figure 5:
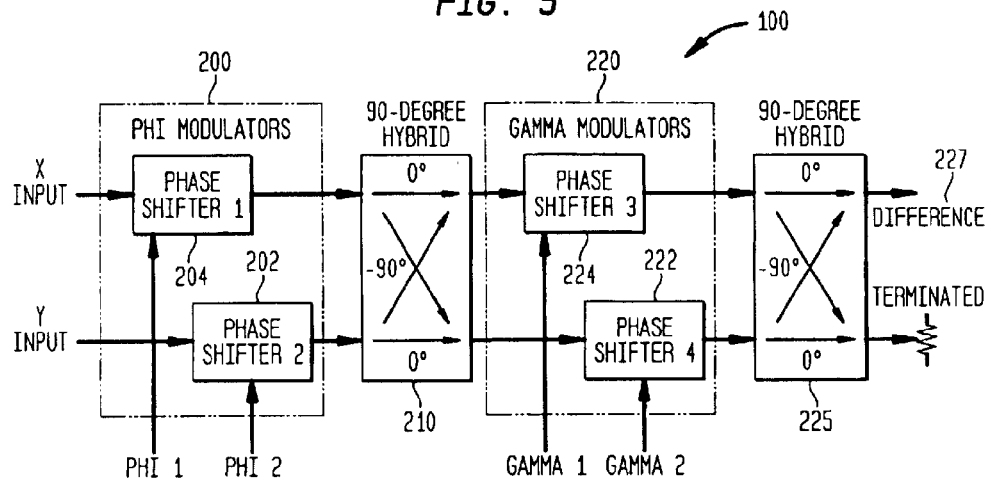
FIG. 5 is a schematic showing the adaptive modulator of the present invention in greater detail.

FIG. 5 is a schematic showing the adaptive modulator 100 of the present invention in greater detail. The adaptive modulator 100 comprises two 90-degree hybrid junctions 210 and 225, a phi phase shifter or modulator 200, and a gamma phase shifter or modulator 220. Each phase shifter 200 and 220 is adjustable over a minimum 0–180 degree range. The phi phase shifter 200 comprises a first phase shifter 202 and a second phase shifter 204. Similarly, the gamma modulator 220 comprises a pair of phase shifters 222 and 224. The phi phase shifter 200 is connected to the input lines from the antenna prior to the first 90-degree hybrid junction 210, and sets the relative phase (phi) of the adaptive modulator 100.

For a voltage null or signal minima, the phase shifters 202 and 204 are set to relative quadrature, and compensate for phase and delay imbalances in each leg of the antenna path, as well as imbalance and imperfection in subsequent hybrids and modulators. The input signals are combined in the first hybrid junction 210. The output signals of the first hybrid are equal in amplitude, and are adjusted in relative phase by the second pair of balanced phase shifters 222 and 224 of gamma modulator 220. The second pair of phase shifters 222 and 224 set the relative amplitude (gamma) of the adaptive modulator 100. Then, the signals are combined in the second 90-degree hybrid junction 225 to produce a voltage null or signal minima at the difference port 227, which is effectively the voltage null of the interference signal. The alternate output of the second hybrid junction 225, termed the sum port, concurrently produces a voltage peak or maxima output. Optionally, a sum output may be generated in addition to the difference output.

The difference output 227 of the modulator 100 of the present invention is sampled in an RF power divider/coupler, such as the coupler 120 shown in FIG. 4. One output of the coupler is provided as the system output and input to a GPS receiver (such as GPS receiver 30 of FIGS. 1 and 2), and includes the received GPS signals with interference suppressed. The second coupler output is the monitor port. The monitor port is amplified and can be used to generate loop controls for null seeking and internal processing.

Figure 6:
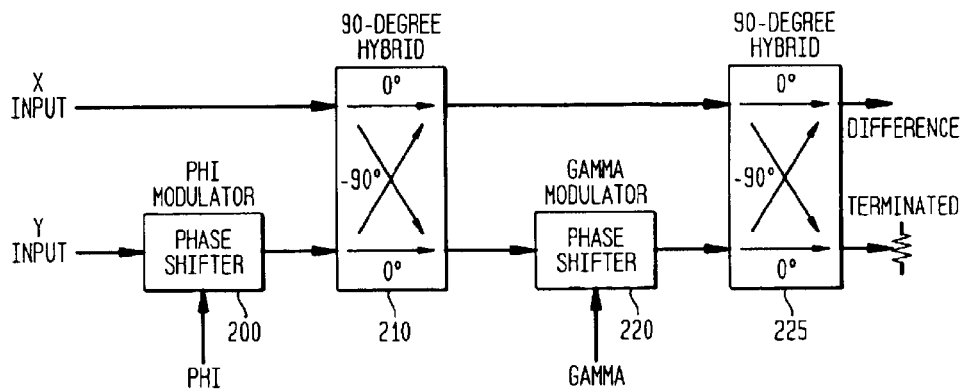
FIG. 6 is a schematic showing an alternate embodiment of the adaptive modulator of the present invention in greater detail.

FIG. 6 is a schematic showing, in greater detail, an alternate embodiment of the adaptive modulator 100 of the present invention. Balanced varactor phase shifter arrangements, discrete phase shifters, or PIN bi-phase modulators can be used in each leg of the modulation process to provide matched modulator operation over a given frequency range and level. A simplified version of the adaptive modulator 100 of the present invention can include an asymmetric or unbalanced phase shifter arrangement to reduce circuitry, such as the configuration shown in FIG. 6. The phi modulator 200 is connected to the Y input of the antenna system, and includes a single phase shifter. Similarly, the gamma modulator 220 includes a single phase shifter, and is connected between the first 90 degree hybrid junction 210 and the second 90 degree hybrid junction 225.

The difference port output of the second hybrid junction 225 is divided in an RF power divider/coupler. One output connects with the interference detection receiver 115 shown in FIG. 4, and the second output is provided as the protected output to a GPS receiver. An alternate embodiment of the present invention can include a numeric emulation of the analog interferometer process realized in digital signal processing. In this implementation, the two input signals from the antenna are band-limited to the GPS band of interest, and are encoded with sufficient resolution to process the combined dynamic range of interest for interference and GPS. Automatic Gain Control (AGC) may be used to optimize implementation. Digital signal processing of the data streams can then be processed in a real-time pipeline processor, batch processor, or Fast Fourier Transform (FFT) processor. Interferometer coefficients for cancellation can be generated in a closed-loop nulling process, or computed directly to provide a null response.

FIGS. 7–11 are flowcharts showing an algorithm according to the present invention for detecting and canceling interference and/or jamming signals on rolling and non-rolling platforms. As mentioned previously, the present invention implements spatial nulling when a platform is rolling, and polarization nulling when the platform is stable or rolling at a slow rate. The algorithm of the present invention determines the mode and state decisions for the AJE of the present invention from detected signals and internal control modulations. The system includes an initialization and built-in-test (BIT) that is activated when the system is powered on. The controller 110, described earlier, may initiate periodic BIT cycles.

The present invention is initially configured to receive GPS signals until interference or jamming is detected. Upon detection of jamming, the present invention follows a sequence where it attempts to spatially search and track the jamming using a spatial null. This sequence is used to suppress the jamming and to determine the roll rate of the platform from the control modulations. A downhill gradient process maintains the null and continues tracking of the null as the platform rolls. The ends of the AJE control ranges are detected and a calibrated wrap process returns operation on each cycle to the middle of the control range. If the platform is still rolling, the system continues to operate in the spatial nulling mode. Otherwise, the present invention switches to polarization nulling by initially determining which antenna to use, and then attempting to search and track the jamming using a polarization null. The tracking procedures of the present invention utilize a downhill gradient process that is maintained until rolling is detected. If an absence of jamming is detected, the present invention returns to GPS receiver mode using the combined antenna configuration.

Figure 7:
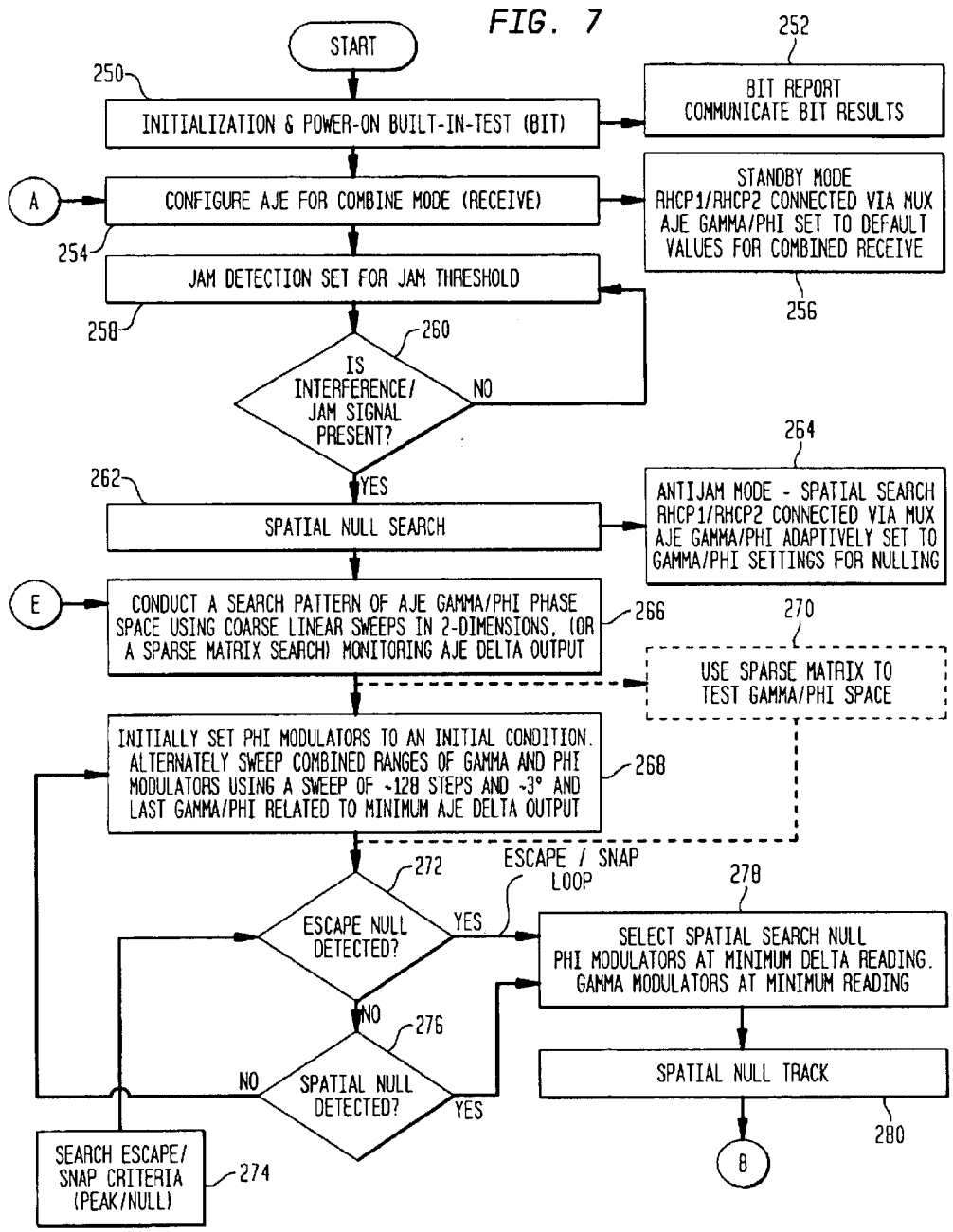
FIGS. 7–11 are flowcharts showing an algorithm according to the present invention for detecting and canceling interference and/or jamming signals on rolling and non-rolling platforms.

Beginning with step 250 of FIG. 7, powering on of the present invention initiates a built-in-test (BIT) of the system processor, and a report of system status is generated in step 252. Electrical testing of the system can be accomplished using an injected signal that causes the system to respond with normal suppression modes and states. The results can be reported as part of the BIT report. Further, the BIT tests can be scheduled or executed by a microprocessor in response to external commands.

After initialization and conducting the BIT, in step 254, the system is initially configured in GPS receive mode, and in step 256, the system sets the AJE to combine mode. In this state, the outputs of both antennas are combined to provide to provide an optimum, 360° GPS antenna pattern for the rolling platform. The delta output port of the AJE is connected to a log-linear or linear receiver, and its output detected, filtered and monitored to determine the level of interference present in the received signal, preferably using an analog-to-digital converter. The detected level is compared to a jam threshold that is selected in step 258 to match the inherent anti-jam capability of the GPS receiver.

The presence of jamming is detected in step 260. If no jamming is detected, step 258 is re-invoked. Otherwise, in steps 262 and 264, the system starts a spatial null search routine to suppress interference. Additionally, spatial nulling is used to determine the roll characteristics of the platform In step 266, a search routine is conducted using either a linear sweep of the 2-dimensional (gamma/phi) controls of the AJE. Optionally, a sparse matrix search of the AJE space (gamma/phi space) can be conducted in step 270. In step 268, a linear spatial search is conducted by alternately sweeping the gamma and phi controls over a cycle of AJE space using a coarse resolution (typically 3°, but other resolutions may be used) while keeping one control at the last minimum control setting. A small number of alternating passes between gamma and phi homes in on and results in a trial spatial null setting. The trial spatial null is passed to a spatial track routine in step 278.

In step 272, an escape loop in the search algorithm detects an escape null, in which case the process immediately passes control to step 278. Otherwise, control is passed to step 276. If a spatial null is detected in step 276, control is passed to step 278; otherwise, step 268 is re-invoked. In step 278, a spatial search null is selected, and the phi and gamma modulators of the present invention are set to minimum readings. On a rolling platform, this process operates similar to a scan-on-scan process, and facilitates rapid acquisition of the spatial null. Control then passes to step 280, wherein the spatial null is tracked.

Figure 8:
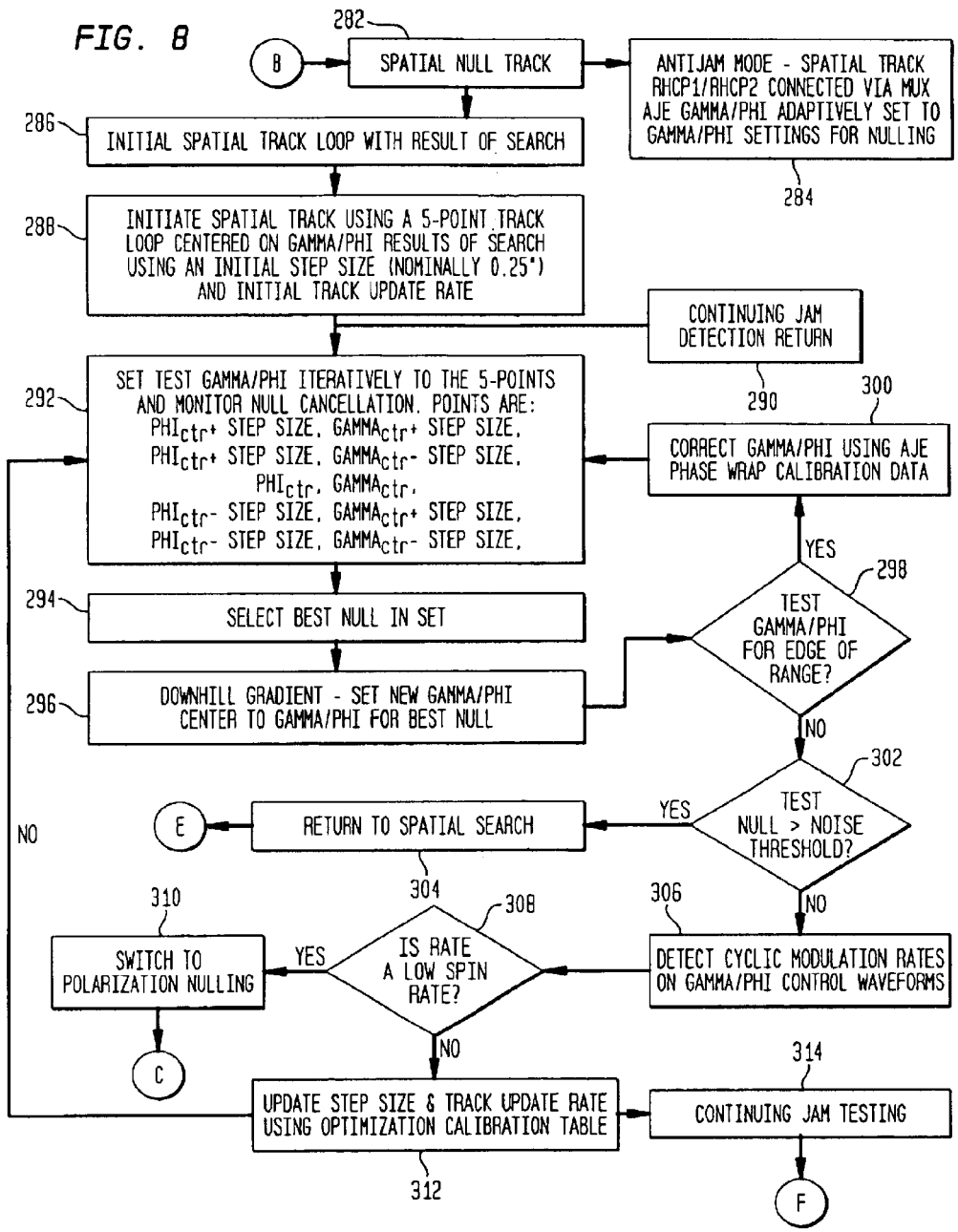

FIG. 8 shows additional processing steps of the algorithm of the present invention. In steps 282 and 284, tracking of the spatial null is initiated. In step 286, an initial spatial tracking loop using the result of the search is initiated, and spatial tracking then occurs in step 288 using a 5-point tracking loop centered on the last null. The initial setting uses the gamma and phi values provided by the search null. The tracking variables "Step Size" and "Track Update Rate" control dynamic performance of the system. The initial value for Step Size is nominally 0.25°, consistent with a 12-bit control range. In step 292, the 5-point track algorithm iteratively steps between the points by incrementing the center gamma/phi setting by plus or minus the Step Size, and by monitoring the null level. This process defines the null region and, in step 294, the best null is selected from the set of measurements. The best null is used as the next center setting and the process repeats continuously.

The selection of the best null from the set drives the tracking algorithm in step 296 downhill to deeper and deeper nulls until the system sensitivity determined by the noise level is reached. The downhill gradient also maintains the null track on a rolling platform by continuously following the null. The Track Update Rate determines the rate at which the test in conducted. In step 298, a determination is made as to whether the gamma/phi modulator controls approach the edge of the control range. If a positive determination is made, step 300 is invoked, wherein the system corrects the gamma/phi setting using an AJE wrap calibration data table defined during the AJE test and integration processes. The wrap calibration effectively moves the operating point of the modulator one cycle closer to the middle of the range. Wrap calibration allows the system to move across the AJE modulator boundaries in gamma and/or phi. Further, wrap calibration can be executed on each cycle of rotation, in each of the two dimensions.

The null is then tested in step 302 to determine how closely it approaches the noise sensitivity of the system. If the null is determined to be poor (i.e., the tested null is greater than the noise threshold), then step 304 is invoked, wherein the system returns to spatial search to select an alternate set of the gamma/phi initial variables for tracking. If the null is determined not to be poor in step 302, then step 306 is invoked, wherein spatial processing continues during tracking to determine the roll rate of the platform. This is accomplished by examining the control waveforms for the gamma and phi values. In the AJE spatial null process, the roll rate is impressed upon the control waveforms. The control waveforms are processed to determine the duration of a cycle, which represents the roll rate.

A determination is made in step 308 as to whether the platform is spinning at a slow rate. If a positive determination is made, step 310 is invoked, wherein the system switches to polarization nulling. Alternatively, if the roll rate is within expected bounds, step 312 is invoked, wherein the system uses the measured rate to optimize spatial nulling performance by selecting a Step Size and Track Update Rate that provide the best performance. This information is contained in a programmed data table determined by design and through empirical tests at the roll rates. Continued jamming tests occur in step 314.

Figure 9:
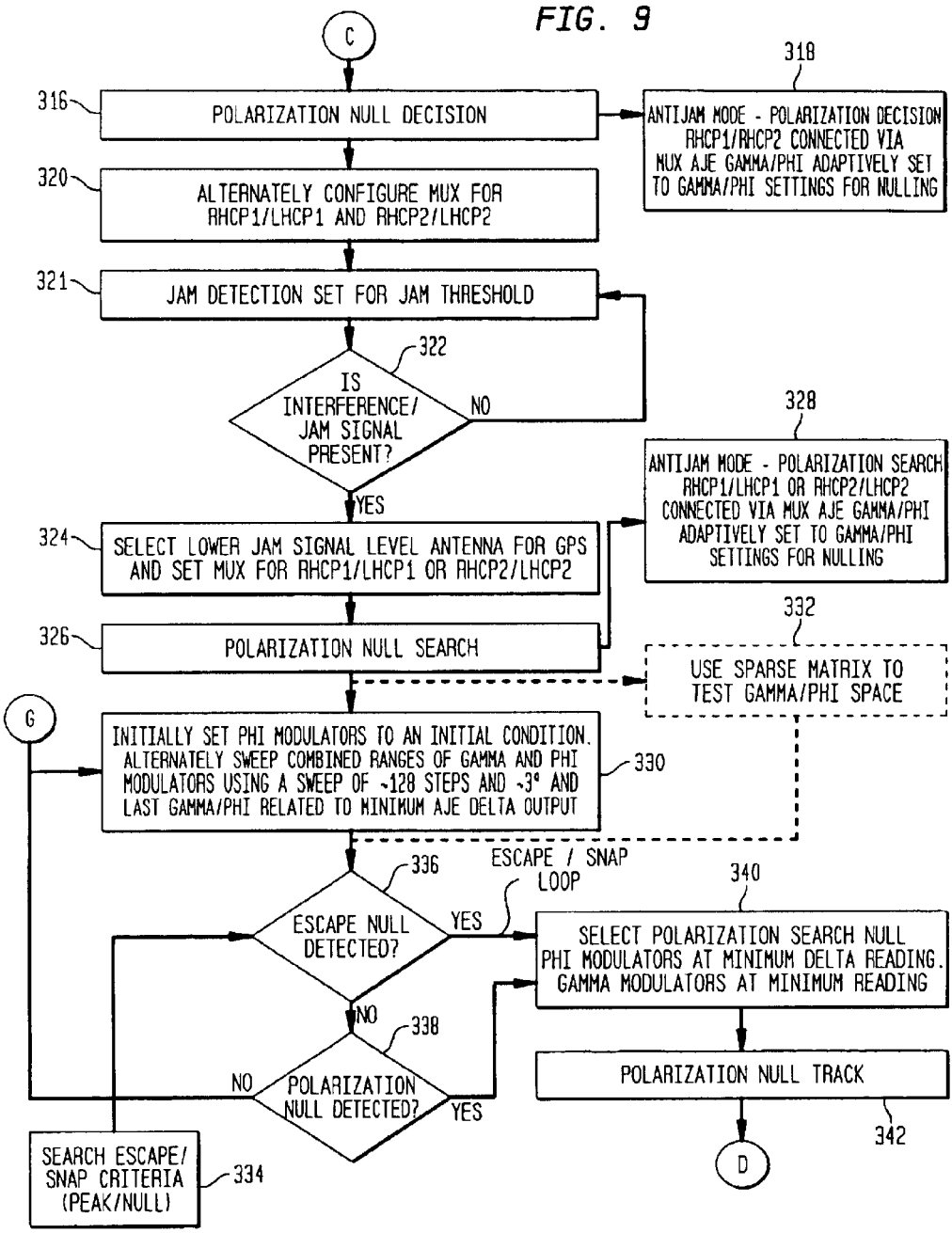

FIG. 9 is a flowchart showing additional processing steps of the algorithm of the present invention. The processes shown in FIG. 9 are invoked by step 310 of FIG. 8 when a decision to switch to polarization nulling is made. Thus, as shown in step 316 and 318 of FIG. 9, a polarization null decision is invoked when the platform is rolling at a very slow rate or is stable. In step 320, a determination is made as to which antenna to use for suppression by alternately connecting the mux of the AJE to the RHCP1/LHCP1 and RHCP2/LHCP2 configurations. In step 321, the system measures the detected jam level for each and uses the antenna configuration with the lower jamming level. In steps 321 and 322, the AJE is configured as a switch, connecting the RHCP port to the delta port. In step 324, the antenna having the lower jamming level is used for polarization, because it generally points away from the jammer (located below the platform), thus resulting in an upwardly-pointed antenna. In steps 326 and 328, a polarization null search is invoked using a process similar to the spatial null search described earlier.

In step 330, a search routine using a linear sweep of the 2-dimensional controls of the AJE is initiated. Optionally, in step 332, a sparse matrix search of the AJE space (gamma/phi space) can be conducted. A linear polarization search is conducted by alternately sweeping the gamma and phi controls over a cycle of AJE space using a coarse resolution (typically 3°, but other resolutions can be utilized), while keeping one control at the last minimum control setting. A small number of alternating passes between gamma and phi homes in on and results in a trial polarization null setting. The trial polarization null is passed to a polarization track routine in step 340.

In step 336, an escape loop in the search algorithm detects a sufficient escape null. If an escape null is detected, control is passed to step 340. Otherwise, control is passed to step 338. If a polarization null is detected in step 338, control is passed to step 340; otherwise, step 330 is re-invoked. In step 340, the polarization track routine is initiated using null settings to shorten the search interval. On a non-rolling platform this process facilitates rapid acquisition of the polarization null.

Figure 10:
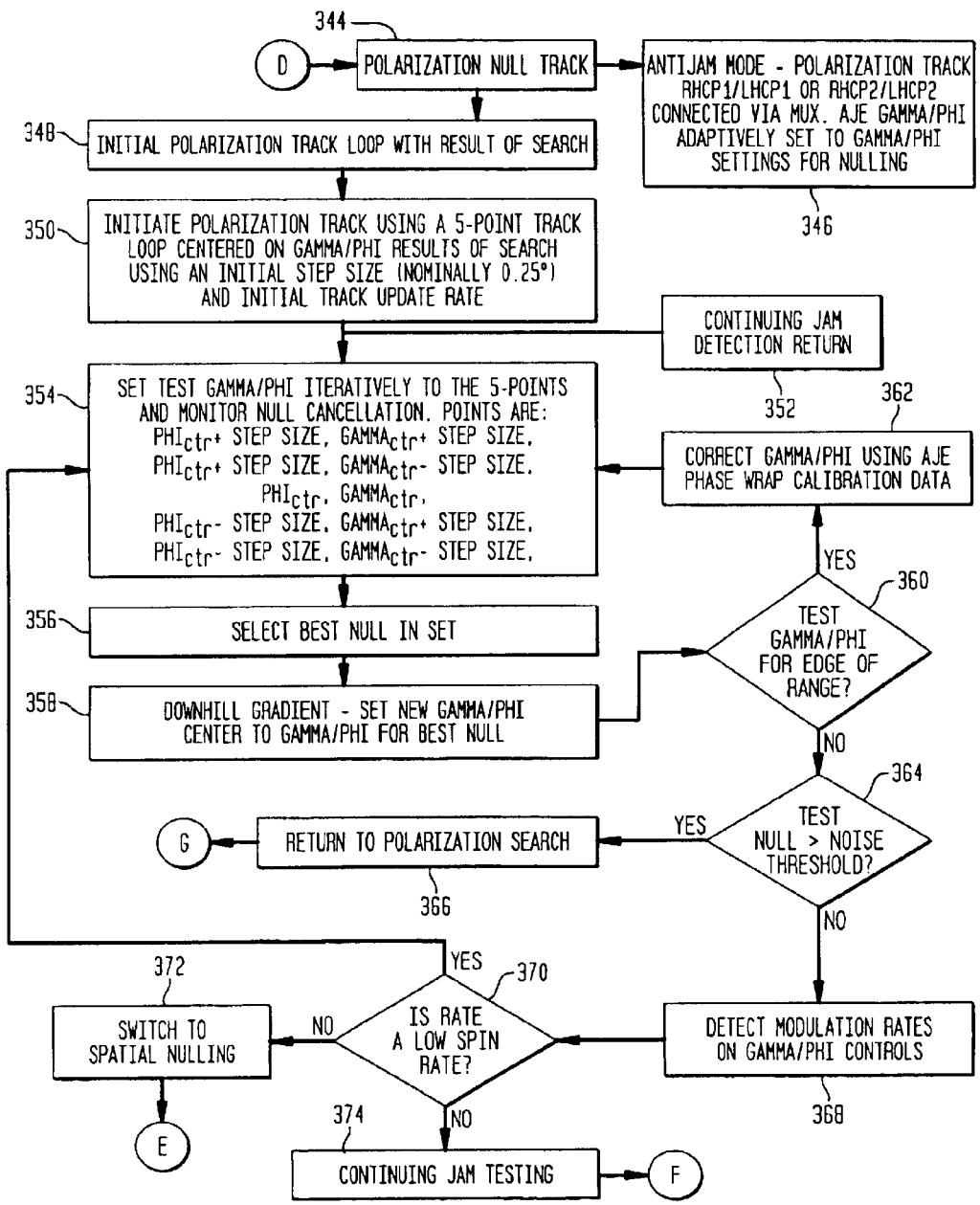

FIG. 10 shows additional processing steps carried out by the algorithm of the present invention. In steps 344 and 346, the polarization null tracking occurs using the null passed by the search routine to initiate tracking. Polarization tracking occurs in step 350 using a 5-point tracking loop centered on the last null. The initial setting uses the gamma and phi values provided by the search null. The tracking variables Step Size and Track Update Rate are not generally varied in polarization track because of the reduced dynamics of the system. The value for Step Size is nominally 0.25°, consistent with a 12-bit control range. In step 354, the 5-point track algorithm iteratively steps between the points by incrementing the center gamma/phi setting by plus or minus the Step Size, and monitors the null level. This process defines the null region and selects the best null from the set of measurements. In step 356, the best null is used as the next center setting and the process is repeated continuously.

The selection of the best null from the set drives the track algorithm in step 358 downhill to deeper and deeper nulls until the system sensitivity determined by the noise level is reached. The downhill algorithm also maintains the null track over system variations by continuously following the null. The Track Update Rate determines the rate at which the test in conducted. In step 360, if the gamma/phi modulator controls approach the edge of a control range, the system detects this condition and initiates step 362, wherein the gamma/phi settings are corrected using an AJE wrap calibration data table defined during the AJE test and integration. The wrap calibration effectively moves the operating point of the modulator one cycle closer to the middle of the range. Wrap allows the system to move across AJE modulator boundaries in gamma and/or phi. If the gamma/phi values are not at the edge of the range, then in step 364, the null is tested for how close it approaches the noise sensitivity of the system. If the null is determined to be poor, step 366 is invoked, wherein the system returns to polarization search to select an alternate set of gamma/phi initial variables for tracking.

Polarization processing continues in step 368 to monitor the roll rate of the platform. This is accomplished by examining the control waveforms for gamma and phi. If roll or maneuver activity is detected in step 370, the system switches back to spatial nulling in step 372. If the situation is benign, the system optimizes polarization nulling performance by selecting a Step Size and Track Update Rate that will provide the best performance, and re-invokes step 354. This information is contained in a programmed data table determined by design and through empirical tests. Continued jam testing occurs in step 374.

Figure 11:
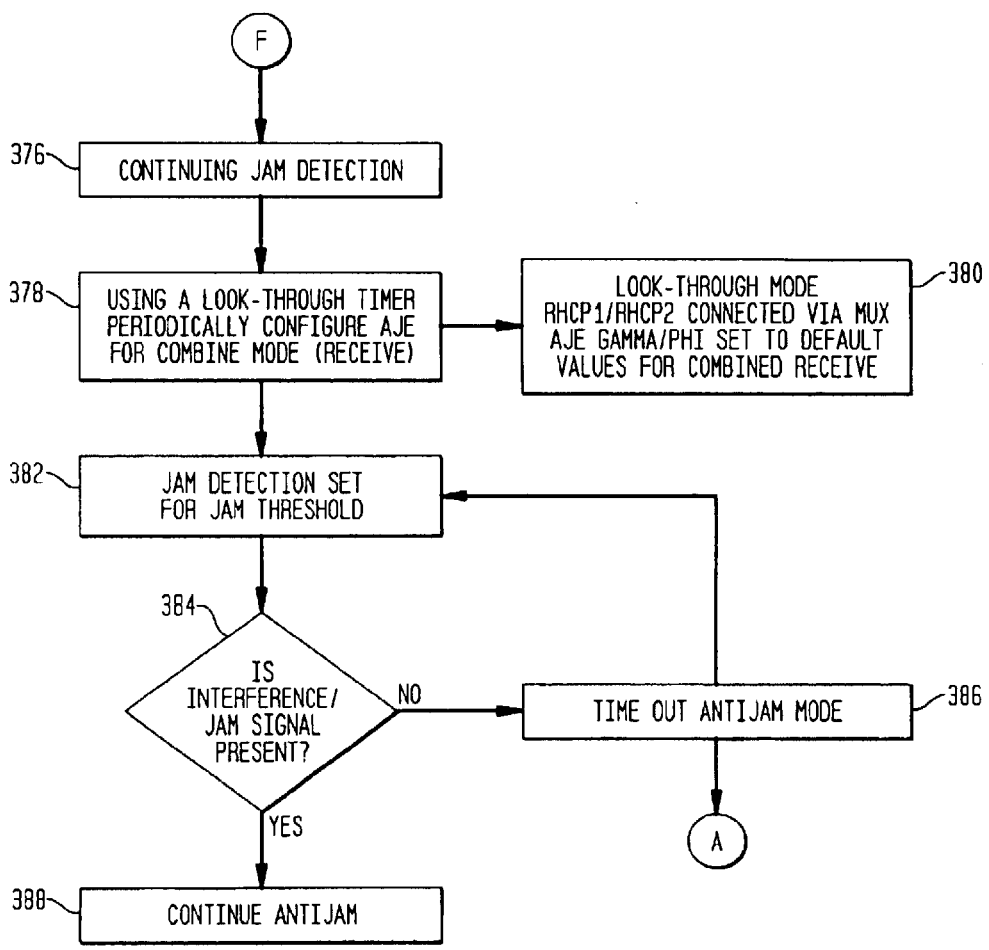

FIG. 11 shows additional processing steps according to the present invention. In step 376, both spatial and polarization tracking routines monitor jamming by periodically conducting a continuing jam test. In steps 378 and 380, the system periodically pauses the nulling process to determine if jamming is still present. Effective nulling suppresses jamming at the AJE delta output port, and jam presence is detected by returning the AJE to GPS receive mode for a short interval. At a scheduled rate the system conducts a look-through by freezing null settings and switching the multiplexer to RHCP1 and RHCP2 for the GPS receive configuration. The output to the GPS receiver may be blanked during this interval to minimize jamming transients.

In steps 382 and 384, the detected level is compared to the jam threshold for the GPS receiver. Upon detection of jamming, the system returns to either spatial or polarization track in step 388. If jamming is not detected, the system conducts a time-out in step 386 for jamming to return, and then returns to GPS receive mode to sense additional jamming.

Having thus described the invention in detail, it is to be understood that the foregoing description is not intended to limit the spirit and scope thereof What is desired to be protected by Letters Patent is set forth in the appended claims.

What is claimed is:

1. A method for reducing interference and jamming in a receiver operating on a moving platform comprising:
   receiving a radio signal with an antenna system mounted on the platform;
   sensing interference or jamming in the radio signal;
   determining platform roll;
   implementing a polarization nulling technique to cancel interference or jamming where there is no roll or slow roll; and
   implementing a spatial nulling technique to cancel interference or jamming where roll exceeds slow roll.

2. The method of claim 1, further comprising synchronizing the nulling technique with a source of interference without using external references.

3. The method of claim 1, further comprising switching from spatial nulling to polarization nulling when platform roll changes from a fast roll to a slow roll.

4. The method of claim 1, further comprising switching from polarization nulling to spatial nulling when platform roll changes from a slow roll to a fast roll.

5. The method of claim 1, further comprising wrap calibrating the polarization nulling technique to produce an optimal polarization null pattern.

6. The method of claim 1, further comprising wrap calibrating the spatial nulling technique to produce an optimal spatial null pattern.

7. An apparatus for reducing interference in a receiver operating on a rolling platform comprising:
   a pair of diametrically-mounted antennas mounted on the rolling platform;
   means for determining interference levels of radio signals received by the antennas;
   means for determining roll rates of the rolling platform;
   a modulator for generating a spatial null pattern and a polarization null pattern; and
   means for selecting between the spatial null pattern and the polarization null pattern based upon the roll rates.

8. The apparatus of claim 7, further comprising means for combining the pair of antennas to produce a receive signal when no interference or jamming is present.

9. The apparatus of claim 7, further comprising a multiplexer connected to the antennas.

10. The apparatus of claim 9, wherein the multiplexer switches the antennas between spatial and polarization nulling modes.

11. The apparatus of claim 7, wherein the modulator modulates phases and amplitudes of radio signals received by the antennas to generate the spatial null pattern and the polarization null pattern.

12. The apparatus of claim 7, further comprising a controller for controlling the modulator.

13. The apparatus of claim 12, wherein the controller controls the modulator in response to sensed interference levels.

14. A method for reducing interference in a receiver operating on a moving platform comprising:
   detecting interference or jamming in a radio signal received by the receiver;
   creating a spatial null pattern if platform roll exceeds slow roll;
   calibrating and maintaining the spatial null pattern with a downhill gradient process if interference levels exceed predetermined thresholds and platform roll exceeds slow roll;
   creating a polarization null pattern if the platform has no roll or slow roll; and
   calibrating and maintaining the polarization null pattern with a downhill gradient process if interference is present and the platform has no roll or slow roll.

15. The method of claim 14, wherein the steps of calibrating and maintaining the spatial and polarization null patterns comprises:
   monitoring relative phases and amplitudes of the radio signal using a tracking loop;
   determining the best null in response to the monitored phases and amplitudes; and
   creating the best null by adjusting the phases and amplitudes of the radio signal.

16. The method of claim 14, further comprising removing the null patterns when interference is not present.

* * * * *